US010054381B1

(12) United States Patent
Heizer et al.

(10) Patent No.: US 10,054,381 B1
(45) Date of Patent: Aug. 21, 2018

(54) SLIDE ASSEMBLY QUICK RELEASE PIN WITH ARM EXTENSION

(71) Applicant: Heizer Defense, LLC, Pevely, MO (US)

(72) Inventors: Charles K. Heizer, St. Louis, MO (US); Thomas C. Heizer, St. Louis, MO (US); John C. Robinson, Festus, MO (US); Jacob W. Mahn, Bloomsdale, MO (US)

(73) Assignee: Heizer Defense, LLC, Pevely, MO (US)

( * ) Notice: Subject to any disclaimer, the term of this patent is extended or adjusted under 35 U.S.C. 154(b) by 0 days.

(21) Appl. No.: 15/823,100

(22) Filed: Nov. 27, 2017

Related U.S. Application Data

(60) Provisional application No. 62/426,965, filed on Nov. 28, 2016.

(51) Int. Cl.
| | |
|---|---|
| *F41A 3/00* | (2006.01) |
| *F41A 3/66* | (2006.01) |
| *F41A 3/86* | (2006.01) |
| *F41A 19/26* | (2006.01) |
| *F41A 19/10* | (2006.01) |
| *F41C 23/16* | (2006.01) |
| *F16B 21/16* | (2006.01) |
| *F41A 11/02* | (2006.01) |

(52) U.S. Cl.
CPC ............... *F41A 19/26* (2013.01); *F41A 3/66* (2013.01); *F41A 19/10* (2013.01); *F41C 23/16* (2013.01); *F16B 21/165* (2013.01); *F41A 11/02* (2013.01)

(58) Field of Classification Search
CPC ...... F41A 3/64; F41A 3/66; F41A 3/86; F41A 3/00; F41A 3/82; F41A 19/10; F41A 19/26; F41C 23/10; F41C 23/16; F41C 27/00

USPC .................................................. 42/108, 1.06
See application file for complete search history.

(56) References Cited

U.S. PATENT DOCUMENTS

| | | | |
|---|---|---|---|
| 694,156 A | 2/1902 | Johnson | |
| 3,145,441 A | 8/1964 | Strandrud | |
| 3,192,820 A | 7/1965 | Pitzer | |
| 3,724,326 A * | 4/1973 | Day | F41A 11/02 42/49.02 |

(Continued)

OTHER PUBLICATIONS

Demon Tactical Quick-Pin [online], Gunblast, Jul. 13, 2010, Retrieved from the Internet: <URL:www.gunblast.com/Demon.htm>.

*Primary Examiner* — Derrick R Morgan
(74) *Attorney, Agent, or Firm* — Creativenture Law, LLC; Dennis J M Donahue, III

(57) ABSTRACT

A slide assembly quick release pin and arm that secure a recoil assembly within a slide. The pin is inserted through a pair of apertures in a front portion of the slide and through a bore in the nose portion of the recoil assembly aligned between the apertures. As the pin secures the recoil assembly within the slide an arm attached to the end of the pin rests in a recess, flush to the body of the slide in a locked orientation. The pin arm is rotated from a locked orientation within the recess in the assembled configuration to an unlocked orientation out of the recess before the firearm is disassembled. Additionally, the arm acts as a handle for grasping and rotating to provide a mechanical advantage when a user is removing or inserting the pin into the apertures and bore.

20 Claims, 4 Drawing Sheets

(56) References Cited

U.S. PATENT DOCUMENTS

| | | | | |
|---|---|---|---|---|
| 3,745,881 | A * | 7/1973 | Roy | F41A 17/36 89/163 |
| 3,857,322 | A * | 12/1974 | Lichtman | F41A 3/82 42/15 |
| 4,563,937 | A * | 1/1986 | White | F41A 3/26 42/7 |
| 4,580,484 | A * | 4/1986 | Moore | F41A 3/44 42/77 |
| 4,602,450 | A * | 7/1986 | Hoenig | F41A 21/487 42/75.02 |
| 4,715,140 | A * | 12/1987 | Rosenwald | F41C 27/22 42/97 |
| 4,726,136 | A * | 2/1988 | Dornaus | F41A 9/53 42/7 |
| 5,734,120 | A * | 3/1998 | Besselink | F41A 3/14 89/163 |
| 6,385,892 | B1 * | 5/2002 | Vendetti | F41C 27/00 42/86 |
| 7,337,571 | B2 * | 3/2008 | McGarry | F41A 3/86 42/16 |
| 7,726,230 | B1 * | 6/2010 | Erdem | F41G 1/01 42/69.02 |
| 7,937,876 | B1 | 5/2011 | Graham | |
| 8,474,169 | B2 | 7/2013 | Cottle et al. | |
| 8,539,706 | B1 * | 9/2013 | Vieweg | F41A 3/82 42/1.06 |
| 8,950,100 | B2 * | 2/2015 | Nebeker | F41A 3/64 42/108 |
| D732,625 | S * | 6/2015 | Heizer | F41A 3/86 D22/104 |
| 9,151,555 | B1 | 10/2015 | Huang | |
| 9,297,401 | B2 | 3/2016 | Langlais et al. | |
| 9,574,835 | B2 * | 2/2017 | Pflaumer | F41A 3/62 |
| 9,915,485 | B2 * | 3/2018 | Hudson, III | F41A 3/86 |
| 2002/0116857 | A1 * | 8/2002 | Wonisch | F41A 3/64 42/75.02 |
| 2005/0188592 | A1 * | 9/2005 | Spinner | F41A 11/00 42/75.03 |
| 2005/0229462 | A1 * | 10/2005 | McGarry | F41A 17/02 42/70.08 |
| 2005/0247187 | A1 * | 11/2005 | McGarry | F41A 3/86 89/198 |
| 2006/0150466 | A1 * | 7/2006 | Hochstrate | F41A 17/72 42/69.03 |
| 2008/0190006 | A1 * | 8/2008 | Jenkins | B25B 27/04 42/90 |
| 2009/0071053 | A1 * | 3/2009 | Thomele | F41A 11/02 42/1.01 |
| 2011/0167704 | A1 * | 7/2011 | Chupp | F41C 27/00 42/90 |
| 2011/0225862 | A1 * | 9/2011 | Lowry | F41A 3/54 42/6 |
| 2014/0165442 | A1 * | 6/2014 | Nebeker | F41A 3/64 42/16 |
| 2014/0338243 | A1 * | 11/2014 | La Vigne | F41A 35/06 42/16 |
| 2015/0276334 | A1 * | 10/2015 | Pflaumer | F41A 3/62 89/191.01 |
| 2015/0316336 | A1 * | 11/2015 | Lee | F41A 3/38 42/16 |
| 2015/0330736 | A1 * | 11/2015 | Love | F41A 5/02 42/16 |
| 2016/0047613 | A1 * | 2/2016 | Hudson, III | F41A 3/86 42/14 |
| 2016/0223276 | A1 * | 8/2016 | Serandour | F41A 3/46 |
| 2016/0356568 | A1 * | 12/2016 | Kuracina | F41A 19/30 |
| 2017/0205163 | A1 * | 7/2017 | Fumia | F41A 3/66 |
| 2017/0234639 | A1 * | 8/2017 | Kuracina | F41A 19/48 89/128 |
| 2017/0268843 | A1 * | 9/2017 | Heizer | F41A 19/14 |
| 2017/0321980 | A1 * | 11/2017 | Wolf | F41A 11/02 |
| 2017/0321981 | A1 * | 11/2017 | Voigt | F41A 11/04 |
| 2018/0031341 | A1 * | 2/2018 | Bubits | F41A 3/14 |
| 2018/0058788 | A1 * | 3/2018 | Singh | F41A 19/12 |
| 2018/0073825 | A1 * | 3/2018 | Zukowski | F41A 3/86 |

* cited by examiner

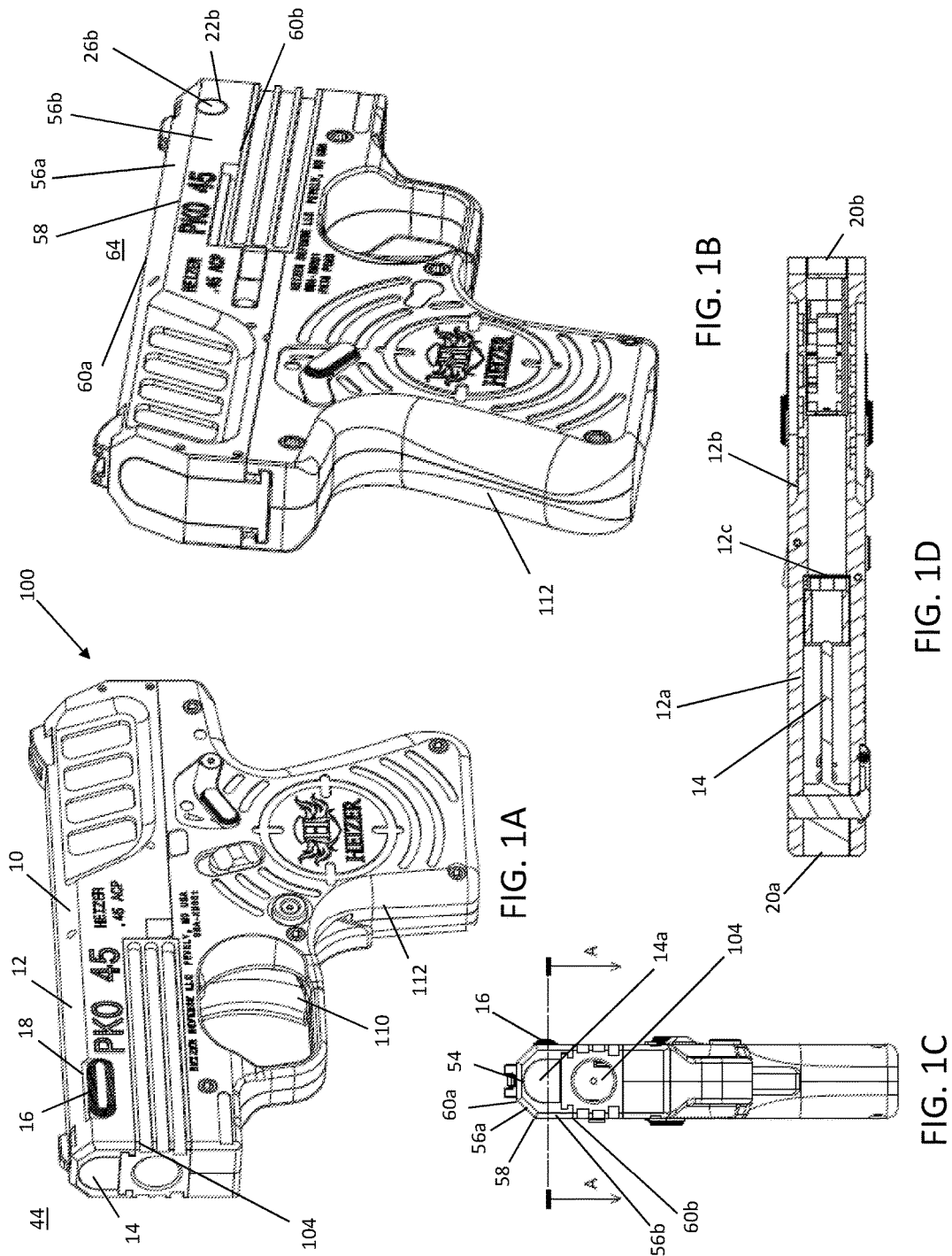

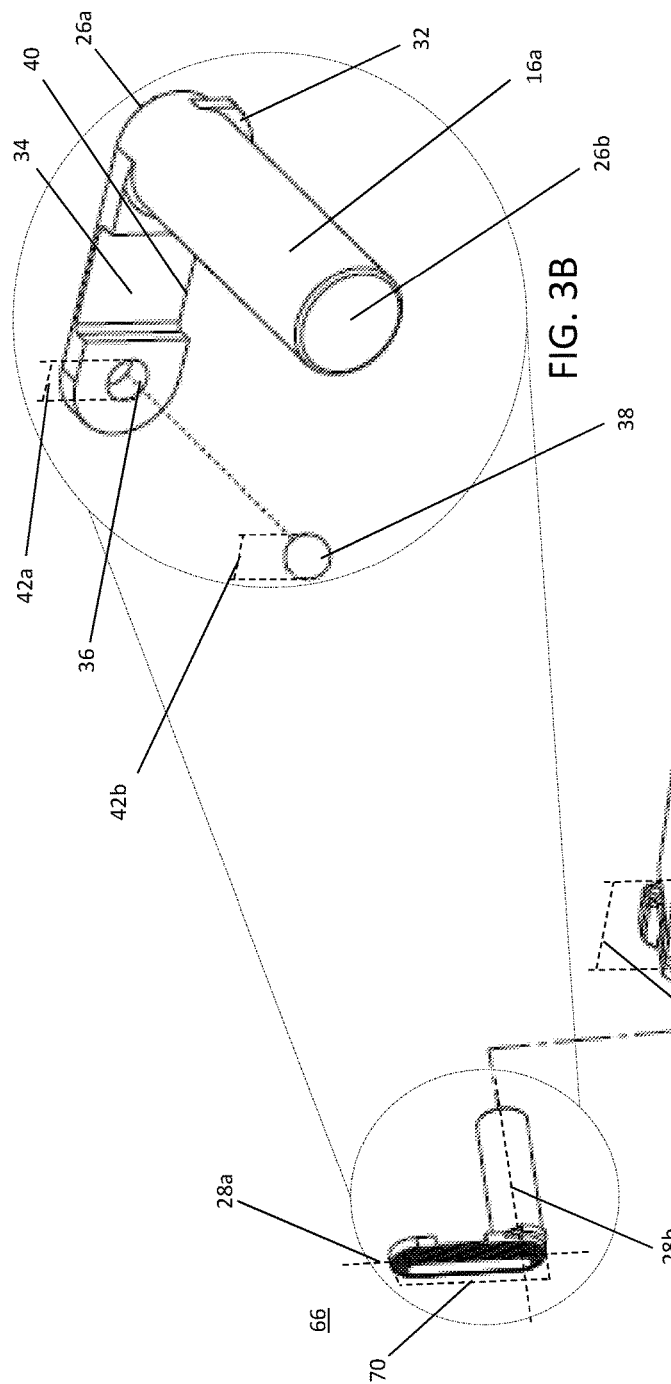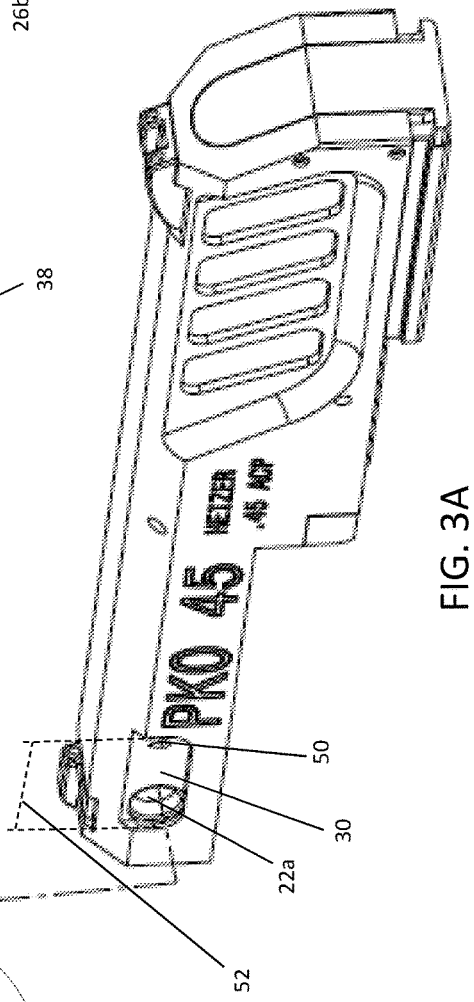

SLIDE ASSEMBLY QUICK RELEASE PIN WITH ARM EXTENSION

CROSS-REFERENCE TO RELATED APPLICATIONS

This application claims priority from U.S. Provisional Patent Application No. 62/426,965 filed Nov. 28, 2016 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to a slide assembly for a firearm, and more particularly to a slide assembly having a quick release pin that aids in the assembly and disassembly of the slide assembly.

Related Art

Firearms in general are traditionally made up of many separate assemblies that function in unison to discharge a projectile. Some of these assemblies include the trigger assembly, recoil assembly, and slide assembly. It is a known advantage to be able to separate these assemblies, or "takedown" the firearm, in order to facilitate easier cleaning and maintenance as the assemblies themselves are more accessible when disassembled. Traditional firearms use "takedown pins" or similarly described pins to hold these components together. Traditionally, one of the firearm components includes cutouts for receiving the lug of a corresponding component and when fit together, a pin locks the lug within the cutout. When the firearm is assembled, the pin extends between the sides of the frame and is flush with the frame on each end. To remove these pins, a punch or other tool is needed as the flush pin does not provide any handle or knob that allow it to be pulled out. Accordingly, there has been a long desire in the art to provide a means for easier and quicker takedown absent additional tools like a punch. Therefore, it is an object of the slide assembly quick release pin and arm to provide such an improvement wherein a slide assembly may be quickly assembled or disassembled without additional tools.

Known prior art has attempted to improve these pins for firearms to facilitate quicker takedown by providing a larger area for gripping of the pin or a variety of textures and patterns, including grooves and dimples, on an end of the pin to increase purchase. For example, previously known improvements can be seen in U.S. Pat. No. 9,151,555 and the Demon Tactical Quick Pin (www.gunblast.com/Demon.htm). The '555 patent particularly discloses a flat portion on the pin head, intended to allow a user to grip the flat portion and pull out the pin without additional tools. Similarly, the Demon Tactical Quick Pin uses a rotating locking lever which is similar to the quick-release locking pins disclosed in U.S. Pat. No. 3,192,820 and U.S. Pat. No. 9,297,401. This lever rests perpendicular to the pin against the firearm frame and rotates away from the frame of the firearm to enable pulling. These improved pins provide an extension on the same longitudinal axis of the pin that a user may grasp to pull the pin out of its aperture. However, these prior art references neither provide leverage for rotating the pin around its longitudinal axis to break static friction nor provide a fixed surface that is perpendicular to the pin's longitudinal axis and extends from the head of the pin by more than a pin diameter. Accordingly, there still is still a need for a takedown pin that increases gripping ability while also providing leverage for rotating the pin to break the static friction while pulling the pin out. In addition, these known pins are not easily adapted to positions on the slide assembly of a firearm.

SUMMARY OF THE INVENTION

Embodiments of the present invention comprise a firearm having a slide and a recoil mechanism that includes a recoil spring and a recoil rod, where the recoil mechanism is positioned above the barrel and generally within the slide of the firearm, collectively forming a slide assembly. The slide assembly has an assembled configuration when the recoil assembly is secured within the slide by the quick release pin. In this configuration, the pin is inserted through a pair of apertures in a front portion of the slide and through a bore in the nose portion of the recoil rod aligned between the apertures. As the pin secures the recoil assembly within the slide, an arm attached to the end of the pin rests in a recess flush to the body of the slide in a locked position.

Accordingly, the slide assembly also has a disassembled configuration where the pin is removed from the apertures and bore, allowing the recoil assembly to come free from the slide. It is an aspect of the present invention that the pin arm is rotated from a locked position within the recess in the slide in the assembled configuration to an unlocked position out of the recess before the firearm is disassembled. The pin arm acts as a handle for grasping and rotating which provides a mechanical advantage when a user is removing or inserting the pin into the apertures and bore, as the rotation helps to combat the effects of friction. Additionally, this mechanical advantage allows a user to assemble and disassemble the firearm without other tools.

Further areas of applicability of the present invention will become apparent from the detailed description provided hereinafter. The detailed description and specific examples of the invention in the specification and drawings are intended for purposes of illustration only and are not intended to limit the scope of the invention.

BRIEF DESCRIPTION OF THE DRAWINGS

The present invention will become more fully understood from the accompanying drawings.

FIGS. 1A and 1B are perspective views of a firearm with a slide assembly quick release pin.

FIGS. 1C and 1D are a front view and a top view, respectively, of a firearm with a slide assembly quick release pin.

FIGS. 3A and 3B are detail views of the quick release pin according to the present invention.

DETAILED DESCRIPTION OF THE PREFERRED EMBODIMENTS

Figures 2A, 2B:
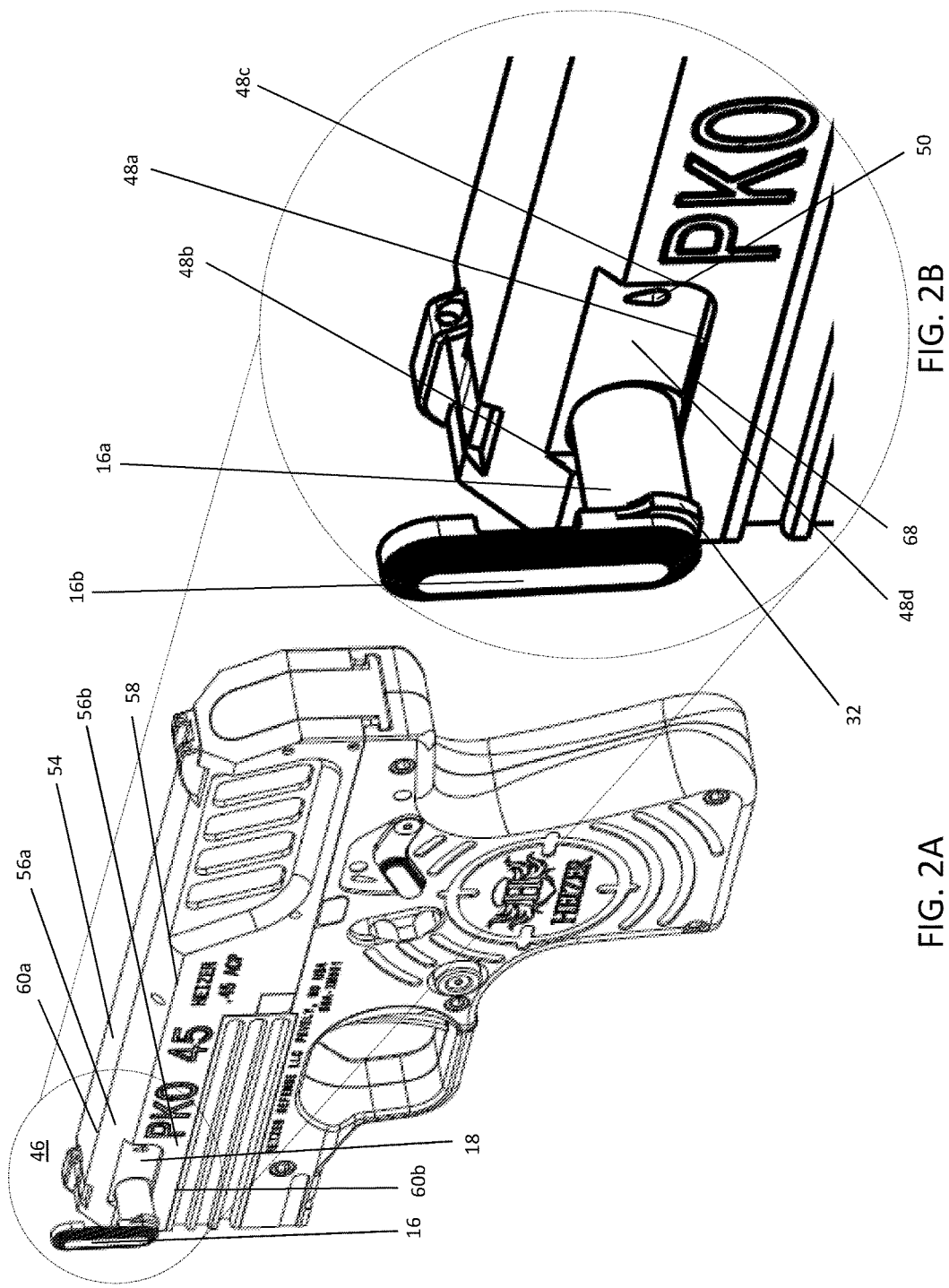
FIGS. 2A and 2B are a perspective view and detail view, respectively, of a partially inserted quick release pin.

The following description of the preferred embodiment(s) is merely exemplary in nature and is in no way intended to limit the invention, its application, or uses. Generally, as shown in FIGS. 1-4, the firearm 100 of the present invention includes a frame 102, a barrel assembly 104 and a slide assembly 10 that contains a casing 12 housing a recoil assembly 14. The slide and recoil assemblies can be located above the gun barrel so that the barrel is situated between the topmost part of the frame and the bottom of the slide assembly or the slide and recoil assemblies may be located between the barrel and the frame as in most semi-automatic pistol configurations. The barrel assembly includes a housing 104a which is covered by the slide assembly and secures one side of the recoil assembly. The barrel assembly can be removably connected to the frame through front 106a and rear mounts 106b that may be secured using removable pins 108. The firearm is operated by the firing system which includes a trigger assembly 110 (not shown in detail) and a linear striker assembly (not shown in detail).

The slide assembly of the present invention includes a casing, a quick release pin 16, and an external recess 18 on the front portion of the casing. The slide assembly has an assembled configuration 64 and a disassembled configuration 66. The recoil assembly generally includes a recoil spring 14c and a recoil rod 14b with a nose portion 14a mounted within the casing. In the assembled configuration the quick release locking pin secures the recoil assembly within the slide. Conversely, when the quick release pin is removed, the recoil assembly is free from the slide in the disassembled configuration. According to the present invention and described in detail below, the release pin includes an arm 16b that extends perpendicularly from the body 16a of the pin at one end of the body and may also include a locking lip 32 proximate at the proximate end of the arm at the body, a detent 38 at the distal end of the arm, and a flexible center section 34 between the proximate and distal ends.

The casing is generally separated into a front casing 12a and a rear casing 12b. The front casing extends from the internal recess 12c within the casing to a distal end 20a around a nose portion of the recoil assembly. Conversely, the rear casing extends in the opposite direction from the internal recess towards the butt end 20b of the casing and firearm. The front casing has a pair of apertures 22a & 22b at the distal end. In the assembled configuration the recoil assembly is housed within the front casing and is secured therein by the quick release pin described below. The recoil assembly is comprised of the nose portion having an elongated rod extending within the casing from the nose portion towards the internal recess. The nose portion of the recoil assembly also has a bore 24 that is aligned between the apertures in the assembled configuration. Accordingly, the recoil assembly is secured within the slide when the body of the quick release pin extends through the pair of apertures in the front casing and through the bore in the nose portion.

When the recoil assembly is secured within the casing by the quick release pin, as shown in FIGS. 1A and 1B, the pin body fully extends between apertures and the bore with the proximal end of the pin 26a flush with the side wall of the firearm in the external recesses and the distal end of the pin 26b flush with the opposite side wall of the firearm. As explained in detail below, the proximal end of the pin is attached to the pin arm which is seated within the external recess in the locked orientation when the firearm is in the assembled configuration. Additionally, in the preferred embodiment the front casing mates with the topmost portion of the barrel and encloses the recoil assembly within an interior space 62 of the front casing, above the top of the barrel. Further, the rear casing is connected to a handle assembly 112 of the firearm proximate to the butt end which may house or be in operable connection with any number of other assemblies commonly seen in firearms such as the trigger assembly.

In the preferred embodiment the casing has a top side 54 and a pair of angled side walls 56 as shown in the figures and particularly shown in the FIG. 1C and FIG. 2A. The side walls extend from an edge 60a of the topside to a bend 58 separating the side walls into two sections. The top section 56a of the side wall is located above the bend and slopes away from the bottom section of the side wall to the edge of the top side. Conversely, the bottom section of the side wall 56b is vertical and arranged perpendicular to the horizontal top side and connected thereto between the top section of the side wall at the bend an a bottom edge 60b proximate to the barrel assembly. Additionally, the pair of apertures are cut from the bottom section proximate to the bend with at least one of the apertures 22a positioned within an external recess as described below and shown in FIGS. 1B and 3A. Accordingly, an external recess is on the outside of the casing and extends horizontally from at least one of the apertures towards the rear casing. In another embodiment not shown in the figures, the casing has an inverted "U" shape with the side walls being perpendicular to the top side without any bend separating the side walls into two sections. In this embodiment the apertures are proximate to the meeting point of the top side and sidewalls, with the external recess again extending along one of the side walls from at least one of the apertures towards the rear casing.

Another aspect of the present invention shown in FIGS. 2B and 3A is the external recess along a side wall of the front casing. In the preferred embodiment, the external recess is set back from the side wall of the firearm to a recessed face 48d. The recessed face is defined by three edges, namely a front edge 48b towards the barrel end of the firearm, a back edge 48c towards the butt end of the firearm, and a bottom edge connecting the front edge to the back edge. As it is an aspect of the pin arm to rotate in and out of 48a the external recess while the pin body extends through the apertures in the side walls and bore, one of the side wall apertures is positioned within the external recess proximate to the front edge and the external recess is open to the top side.

The recessed face is open to the top side and the recessed width 52 distance between the front and back edge of the external recess is greater than the length of the pin arm 70. In the preferred embodiment the slide assembly has a single external recess with one of the pair of apertures cut within the recessed face, proximate to the front edge. Further, there is a dimple 50 within the recessed face proximate to the back edge and separated from the aperture. The ball detent particularly described below is seated within the dimple and prevents unintended rotation of the pin out of the external recess. Additionally, the bottom edge of the recessed face has a slot 68a that prevents the pin arm from sliding out of the recess and aperture. The slot is cut into the bottom edge, and the locking lip 32 fits within the slot in the locked orientation. Accordingly, the pin arm is secured within the recess in the locked orientation by the ball detent and locking lip. Additionally, a front face of the pin arm is flush with the side wall of the firearm, as shown in FIG. 1.

As depicted in FIGS. 2 and 3, the quick release pin has a pin body that extends through the pair of apertures in the front casing and the bore in the nose of the recoil assembly. Additionally, the quick release pin is made up of a pin arm attached perpendicular to the proximal end of the pin body such that the longitudinal axis of the pin arm 28*a* is substantially perpendicular to the longitudinal axis of the pin body 28*b*. The pin arm is made up of the features shown in FIG. 3B which include the locking lip, flex cut-out chamfer 34, and ball detent. The locking lip extends from the bottom edge of the pin arm 40 proximate to the pin body in a direction that is laterally away from the longitudinal axis of the pin arm. On the opposite end of the pin arm from pin body and locking lip is a ball detent secured within a cavity 36 in the pin arm by at least one of a friction fit and an interference fit. Regardless of whether a friction fit or an interference fit is used, the cavity has a cavity diameter 42*a* and the ball detent has a ball detent diameter 42*b*. In a friction fit arrangement the ball detent diameter is approximately equal to the cavity diameter. Conversely, when the ball detent is secured within the cavity by the interference fit the ball detent diameter is greater than the cavity diameter.

Accordingly, the pin arm has a locked orientation 44 in the assembled configuration and an unlocked orientation 46 in the disassembled configuration. When locked, the pin arm is rotated into the external recess against the exterior of the front casing 30 and the longitudinal axis of the pin arm is parallel to the bottom edge of the external recess. In this position, the locking lip of the pin arm extends into the slot in the bottom edge of the recess and the pin body may not be pulled out without the locking lip first being rotated out of the slot. To prevent unintended rotation, the ball detent locks within the dimple in the recessed face. As the ball detent protrudes perpendicularly from the pin arm, it rubs against the recessed face and friction is created as it rotates into the locked orientation and is seated in the dimple. To prevent wear and deterioration on the ball detent and recessed face, the pin arm has a flex cut-out between its connection at the pin body and the ball detent, which acts as a spring. During this rotation, the flex cut-out allows the pin arm and ball detent to bend away from the recessed face to prevent unwanted wear.

The ball detent is separated from the pin body by the flex cut-out chamfer which acts as a spring when the pin arm is rotated between the locked and unlocked orientations. When the firearm is assembled and the quick release pin is in the locked orientation the pin body extends through the apertures and the bore while the locking lip and ball detent secure the pin arm within the external recess where the locking lip is seated within the slot and the ball detent is seated within the dimple. In operation the cut-out in the pin arm allows the pin arm to flex during rotation as the ball detent moves in and out of the dimple in the recessed face of the external recess. Without the cut-out, the pin may still rotate between the two orientations but the flexing motion of the pin arm allows the ball-detent to more easily move in and out of the dimple and the side walls may tend to deteriorate more quickly from the friction between the side wall and ball detent during rotation. Additionally, the flexing motion provides leverage as the user can flex the pin arm away from the side wall of the firearm to gain more purchase on the pin arm during rotation.

Conversely, the pin arm is rotated out of the external recess in the unlocked orientation and is removed from the recessed face as shown in FIGS. 2 and 3A. In the preferred embodiment the pin arm rotates to a position removed from the recessed face as the sloped top section of the side wall extends away from the plane on which the pin arm rotates. In another embodiment the pin arm rotates to a position above the top side of the inverted "U" shaped casing where there is no portion of the casing behind the pin arm. Regardless of the embodiment, there is nothing behind the pin arm in the unlocked orientation and a user may slide there finger behind the pin arm and pull the pin body out of the apertures and bore. Additionally, the rotation of the pin body within the apertures and grooves caused by the rotation of the pin arm breaks the static friction holding the slide assembly in the assembled configuration and facilitates easier removal of the pin body from the apertures and bore.

Figure 4:
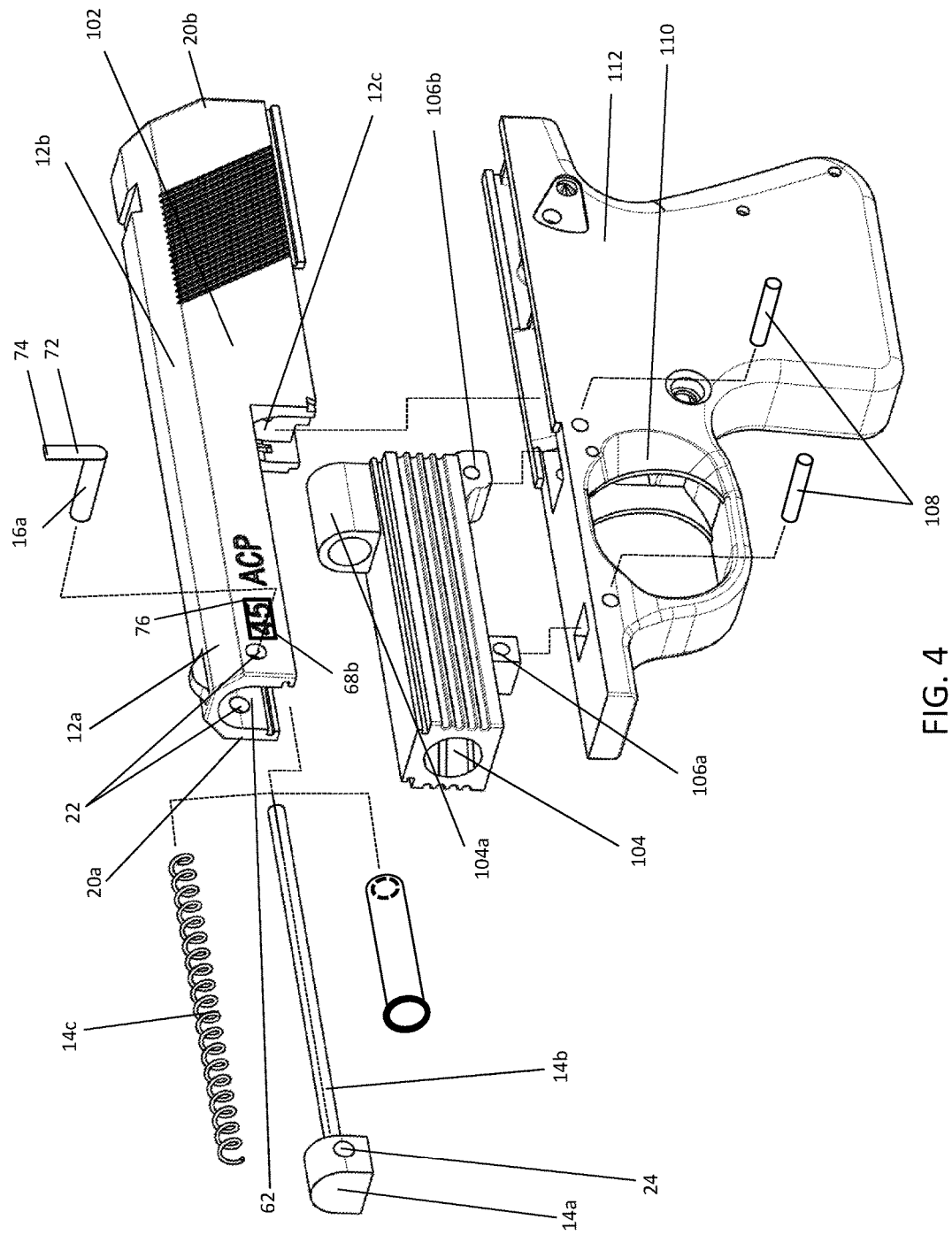
FIG. 4 is an exploded view of the preferred firearm using a slide assembly quick release pin.

Additionally, it should be appreciated that the pin of the present invention is not limited to use in any one position. The preferred embodiment described herein describes a pin used in a semi-automatic pistol that connects the recoil assembly to the slide assembly. However, the quick release pin may be used in other embodiments separate from the slide assembly, such as in the positions of traditional takedown and pivot pins 108 shown in FIG. 4. The pin of the present invention is not intended for the limited use in a conventional firearm having a rear takedown pin and pivot pin but instead may be used in all types of firearms, conventional or otherwise, including in a slide assembly that secures the recoil assembly within the slide. Accordingly, the quick release pin may function to hold other firearm components together, like an upper and lower receiver, so long as an external recess is provided. FIG. 4 illustrates an example of the present invention in which the arm of the pin is held in an alternative slot 68*b* that extends outwardly from the sidewall of the casing. Preferably, the center section 72 of the arm is held by a friction fit within the slot, and the distal end of the arm 74 extends out from the end of the slot 76. Accordingly, in this embodiment, there is no need for a lip or a detent at the end of the arm. It will also be appreciated that the arm and slot combination shown in FIG. 4 could also be used with quick release pins in the body of the firearm frame, such as the pins that hold the barrel to the frame. In these embodiments, it is important for the arm to extend flush along the sidewall of the firearm, which for most applications will have the arm being aligned with and adjacent to the sidewall and perpendicular to the body.

In operation, it is an aspect of the quick release pin is to provide an easier means to remove and insert the pin into the aperture and subsequently assemble a firearm. The pin body acts to secure the components but the improvement is achieved by the pin arm. The pin arm acts as a handle for a user by providing a larger area for grasping which more easily allows the pin to be pulled or pushed in and out of the apertures. Beyond the larger area for increased purchase, the pin arm being perpendicularly fixed provides a mechanical advantage as a user may pull from a different longitudinal axis than the pin body. Such a configuration allows a user to hook the pin arm from behind rather than simply grasping it as an extension of the pin body. Accordingly, the handle eliminates the need for a tool previously needed to punch the pin out when in the assembled configuration. In addition to being a handle for pulling, the pin arm also rotates from the locked orientation within the external recess to the unlocked orientation removed from the recessed face. The rotation of the pin body, via the pin handle, creates a mechanical advantage as the initial static friction is overcome, which facilitates easier removal of the pin body from the apertures and bore. Similarly, the pin arm provides a mechanical advantage during assembly when the pin body is being inserted through the apertures and bore as it may again be rotated to combat friction.

It will also be appreciated that the innovative locking lip seated in the slot prevents the pin from being shook loose and vibrated out of the bore in the nose portion of the recoil assembly and the apertures in the front casing when the gun is repeatedly fired. The ball detent prevents the distal end of the arm from rotating out of its locked orientation when the locking lip is seated in the slot. The flex in the center portion of the arm provides a spring mechanism to the arm in which the detent is forced into the dimple in the sidewall of the recess and is allowed to bend slightly outwardly when a user forces the arm to rotate upward out of the recess in the slide.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A slide assembly for a firearm having a barrel and a frame, comprising:
   a casing comprised of a front casing, an internal recess and a rear casing, wherein the front casing extends from the internal recess to a distal end, and wherein the front casing further comprises a pair of apertures spaced above the frame;
   a recoil assembly comprising a nose portion situated within the distal end of the front casing, wherein the nose portion of the recoil assembly comprises a bore aligned with the pair of apertures;
   a pin fixedly locking the recoil assembly to the casing, wherein the pin is comprised of a pin body and a pin arm, wherein the pin arm is fixedly attached to an end of the pin body, wherein the pin body has a first longitudinal axis and the pin arm has a second longitudinal axis that is askew from the first longitudinal axis, wherein the pin body extends through the apertures and the bore, and wherein the pin arm abuts an exterior of the front casing; and
   an external recess on the casing, wherein the external recess is proximal to at least one of the apertures in the front casing, and wherein the pin arm abuts the exterior of the front casing within the external recess.

2. The slide assembly of claim 1, wherein the pin arm is comprised of a locking lip, a flex cut-out, a cavity, and a ball detent, wherein the locking lip extends below a bottom edge of the pin arm proximate to the end of the pin body, wherein the cavity is separated from the end of the pin body by the flex cut-out, and wherein the ball detent is secured within the cavity by at least one of a friction fit and an interference fit.

3. The slide assembly of claim 2, wherein the cavity is further comprised of a cavity diameter, wherein the ball detent is further comprised of a ball diameter, wherein the ball detent diameter is approximately equal to the cavity diameter when the ball detent is secured within the cavity by the friction fit, and wherein the ball detent diameter is greater than the cavity diameter when the ball detent is secured within the cavity by the interference fit.

4. The slide assembly of claim 1, further comprising a locked orientation and an unlocked orientation, wherein the second longitudinal axis of the pin arm is substantially perpendicular to the first longitudinal axis of the pin body, wherein the pin arm abuts an exterior of the front casing within the external recess in the locked orientation, wherein the pin arm is rotated away from the external recess in the unlocked orientation, and wherein the pin arm is separated by a distance from the front casing in the unlocked orientation.

5. The slide assembly of claim 4, wherein the external recess is further comprised of a recessed face, a recessed bottom edge, a recessed front edge, a recessed back edge, and a dimple, wherein the recessed face is further comprised of at least one of the pair of apertures, wherein the aperture is proximate to the front edge, wherein the recessed front edge and the recessed back edge are separated by a recessed width, wherein the recessed width is longer than the pin arm, wherein the dimple is proximate to the recessed back edge, wherein the ball detent is seated within the dimple in the locked orientation, wherein the bottom edge is comprised of a slot, and wherein the locking lip fits within the slot in the locked orientation.

6. The slide assembly of claim 1, wherein the casing is further comprised of a top side and a pair of side walls, wherein the side walls are comprised of a first section between the top side and a first bend and a second section between the first bend and a bottom edge, wherein the pair of apertures is disposed on the second sections and the external recess is disposed on at least one of the second sections, and wherein the recoil assembly is further comprised of a recoil rod connected to and extending away from the nose portion within the internal recess toward the rear casing and a recoil spring situated around the recoil rod.

7. The slide assembly of claim 1, wherein the front casing mates with the barrel and encloses the recoil assembly in an interior space between the front casing and a top side of the barrel, wherein the front casing is slidably connected to the top side of the barrel, and wherein the rear casing is slidably connected to a first side and a second side of a handle portion proximate to a butt end of the frame.

8. The slide assembly of claim 1 further comprising an assembled configuration and a disassembled configuration, wherein the pin body extends through the apertures and the bore and the pin arm is in the locked orientation in the assembled orientation, wherein the recoil assembly is secured within the slide in the assembled orientation, wherein the pin body is removed from the apertures and the bore and the pin body is separated front the casing in the disassembled configuration, and wherein the recoil assembly is free from the slide in the disassembled configuration.

9. A slide assembly for a firearm having a barrel and a frame, comprising:
   a casing comprised of a front casing, an internal recess and a rear casing, wherein the front casing extends from the internal recess to a distal end, and wherein the front casing further comprises a pair of apertures spaced above the frame, a slot, and a dimple in a sidewall of the front casing;
   a recoil assembly comprising a nose portion situated within the distal end of the front casing, wherein the nose portion of the recoil assembly comprises a bore aligned with the pair of apertures;
   a pin fixedly locking the recoil assembly to the casing, wherein the pin is comprised of a pin body and a pin arm, wherein the pin arm is fixedly attached to an end of the pin body, wherein the pin body has a first longitudinal axis and the pin arm has a second longitudinal axis that is askew from the first longitudinal axis, wherein the pin has a locked orientation with the pin arm abutting the sidewall of the front casing and the pin body extends through the apertures and the bore and an unlocked orientation in which the arm is rotated away from the sidewall of the front casing and the pin body slides outwardly from the apertures and the bore, wherein the pin arm is comprised of a locking lip, a detent, and a flexible center section between the locking hp and the detent, wherein the locking lip extends laterally away from the second longitudinal axis of the pin arm and is situated in the slot of the casing when the pin is in the locked orientation, wherein the detent is situated in the dimple of the sidewall in the front casing when the pin is in the locked orientation, and wherein the flexible center section forces the detent toward the dimple when the pin arm is situated in the slot of the casing.

10. The slide assembly of claim 9, wherein the locking lip is located at a proximate end of the pin arm adjacent to the pin body, wherein the flexible center section of the pin arm is a flex cut-out, and wherein the detent is comprised of a ball detent within a cavity at a distal end of the pin arm, and wherein the ball detent is secured within the cavity by at least one of a friction fit and an interference fit.

11. The slide assembly of claim 9, wherein the sidewall of the front casing is further comprised of an external recess with a recessed face, a recessed bottom edge, a recessed front edge, and a recessed back edge, wherein at least one of the pair of apertures is situated in the recessed face proximate to the front edge, and wherein the slot is situated in the bottom edge.

12. The slide assembly of claim 11, wherein the recessed front edge and the recessed back edge are separated by a recessed width, wherein the recessed width is longer than the pin arm, wherein the dimple is proximate to the recessed back edge.

13. The slide assembly of claim 9, wherein the front casing mates with the barrel and encloses the recoil assembly in an interior space between the front casing and a top side of the barrel, wherein the front casing is slidably connected to the top side of the barrel, and wherein the rear casing is slidably connected to a first side and a second side of a handle portion proximate to a butt end of the frame.

14. The slide assembly of claim 9, wherein the recoil assembly is further comprised of a recoil rod connected to and extending away from the nose portion within the internal recess toward the rear casing and a recoil spring situated around the recoil rod.

15. The slide assembly of claim 9, further comprising an assembled configuration and a disassembled configuration, wherein the pin body extends through the apertures and the bore and the pin arm is in the locked orientation in the assembled orientation, wherein the recoil assembly is secured within the slide in the assembled orientation, wherein the pin body is removed from the apertures and the bore and the pin body is separated front the casing in the disassembled configuration, and wherein the recoil assembly is free from the slide in the disassembled configuration.

16. A slide assembly for a firearm having a barrel and a frame, comprising:
   a casing comprised of a front casing, an internal recess and a rear casing, wherein the front casing extends from the internal recess to a distal end, and wherein the front casing further comprises a pair of apertures spaced above the frame and a slot in a sidewall of the front casing;
   a recoil assembly comprising a nose portion situated within the front casing, wherein the nose portion has a bore aligned with the pair of apertures;
   a pin fixedly locking the nose portion to the casing, wherein the pin is comprised of a pin body and a pin arm, wherein the pin arm is fixedly attached to an end of the pin body, wherein the pin body has a first longitudinal axis and the pin arm has a second longitudinal axis that is substantially perpendicular to the first longitudinal axis, wherein the pin has a locked orientation with the pin arm aligned with and abutting the sidewall of the front casing with a portion of the pin arm situated within the slot and the pin body extends through the apertures and the bore, and wherein the pin has an unlocked orientation in which the arm is rotated away from the sidewall of the front casing disengages from the slot, and the pin body slides outwardly from the apertures and the bore.

17. The slide assembly of claim 16, wherein the front casing is further comprised of an external recess with a recessed sidewall and a dimple in the recessed sidewall, wherein the slot is in a bottom edge of the external recess, wherein the pin arm is further comprised of a locking lip, a detent, and a flexible center section between the locking lip and the detent, wherein the locking lip extends laterally away from the second longitudinal axis of the pin arm and is situated in the slot at the bottom edge of the external recess when the pin is in the locked orientation, wherein the detent is situated in the dimple of the recessed sidewall in the front casing when the pin is in the locked orientation, and wherein the flexible center section forces the detent toward the dimple when the pin arm is situated in the slot of the casing.

18. The slide assembly of claim 16, wherein the pin arm is held by a friction fit within the slot in the sidewall of the front casing when the pin is in the locked orientation.

19. The slide assembly of claim 17, wherein a length of the pin arm is greater than a width of the slot, wherein a proximal end of the pin arm is adjacent to the pin body and is not contained within the slot when the pin is in the locked orientation, wherein a distal end of the pin arm extends past a side of the slot when the pin is in the locked orientation.

20. The slide assembly of claim 16, wherein the recoil assembly comprises, a recoil rod connected to and extending away from the nose portion within the internal recess toward the rear casing, and a recoil spring situated around the recoil rod.

* * * * *